Patented Apr. 21, 1942

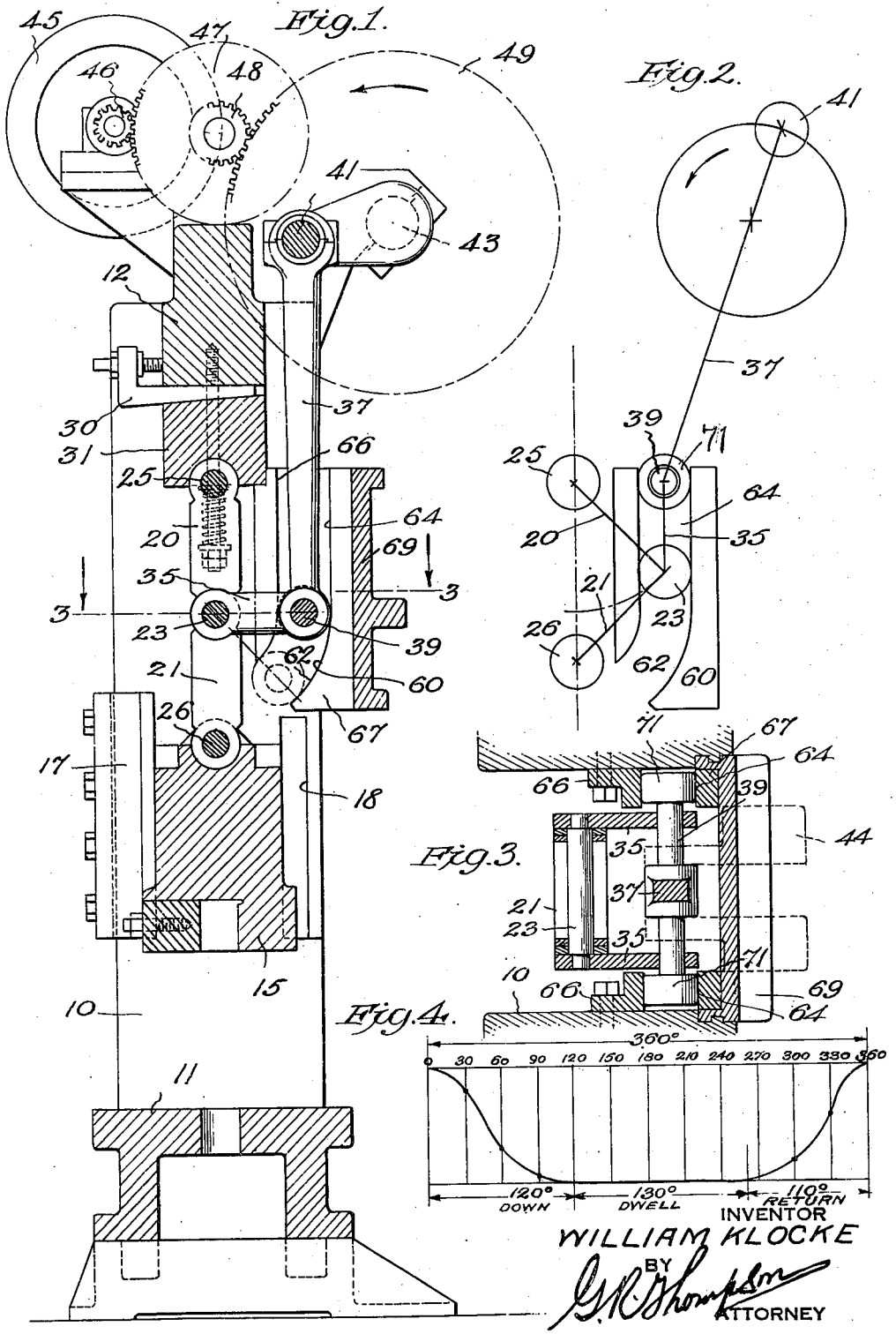

2,280,587

UNITED STATES PATENT OFFICE 2,280,587

PRESS

William Klocke, Woodhaven, N. Y., assignor to E. W. Bliss Company, Brooklyn, N. Y., a corporation of Delaware Application March 20, 1941, Serial No. 384,339

5 Claims. (Cl. 74—38)

This invention relates to mechanical presses, and provides improvements therein.

The most advanced manufacturing practice requires great precision in press formed articles, to avoid in whole, or in great part, subsequent operations to bring them to accurate size, form and ofttimes finish. The accuracy of the formed articles is dependent not only on the mechanical perfection of the press, (a precise and uniform bottom-of-the-stroke position of the reciprocatory tool-carrying slide, best obtained in a mechanical press, etc.) but also on the stabilization, before the forming operation ends, of the internal stresses set up in the forming operation in the article being formed. That is, after the article is formed, internal stresses should not be left therein which will warp or otherwise bring about deformation from the accurate and precise form imparted thereto by the forming dies. To attain such desired or permanent accuracy of the press-formed article it appears to be not only necessary for the resistance of the material of which the article is being formed to be overcome by the forming tools, but there must also be a time interval during the action of the forming tools within which the internal stresses may play out. In metals for example, strong internal stresses are set up during the forming operation, and to a lesser degree in many other materials.

Furthermore, modern industrial advance is in the direction of producing intricate shapes by press operations. For full and sound articles the material requires a certain time to flow into the recesses of a mold, displace the air in such spaces, and take a set.

The present invention provides a press having a novel slide movement. The slide, with reference to the slide movement of an ordinary crank-driven slide, moves faster in the idle parts of the stroke, that is, during the larger part of the return stroke and during the larger part of the working stroke, has an absolute dwell in its bottom-of-the-stroke position, the duration of which can be widely varied, and has a slow end movement just before its absolute dwell. An absolute dwell of the slide in its bottom-of-the-stroke position, through 130° of its operating cycle may be readily obtained, the return and working strokes being effected in the remainder of the 360°, also a slow end movement approaching the bottom-of-the-stroke position. Moreover, the slide has a uniformly precise bottom-of-the-stroke position.

By such novel slide movement the forming tools or dies carried by the slide and by the bed of the press respectively, apply the force of the press to the material to be formed, initially quickly, and then slowly, progressively slowly, as the slide approaches its bottom-of-the-stroke position; time is provided for the material to flow to fully and accurately fill all parts of the space within the dies, including deep recesses and to displace air from the space within the dies; the material being formed is held under a constant force or compression for a prolonged period of time, in which the internal stresses in the material being formed may become exhausted or weakened to an extent that the article after removal from the dies does not warp or become deformed by reason of internal stresses; and the manufacture of uniform and precisely formed articles in a press made with greater facility and perfection than heretofore.

The invention further provides a mechanical type press having the novel slide movement hereinbefore referred to comprising slide operating parts capable of transmitting advantageously large and concentrated driving forces, in which the driving force is transmitted from one part to another at good angles, and having a mechanical construction which is simple, efficient and strong.

An embodiment of the invention is illustrated in the accompanying drawing.

Referring to said drawing:

Fig. 1 is a vertical sectional view of said embodiment.

Fig. 2 is a diagrammatic view of the part shown in Fig. 1, illustrating the position of the slide operating parts, at the top of the stroke.

Fig. 3 is a transverse sectional view on the line 3—3, Fig. 1.

Fig. 4 is a graph illustrating the slide movement.

Referring to said drawing, numeral 10 designates a press frame comprising a bed 11, and a crown 12. Numeral 15 designates a reciprocatory tool-carrying slide, the reciprocatory movements of which are guided in a suitable manner, as by means of gibs 17, 18 on the frame.

The means for reciprocating the slide 15 comprises toggle levers 20, 21, connected together as indicated at 23, and to the crown and slide respectively, as indicated at 25, 26. In the illustrated embodiment, the crown as shown is provided with means for adjusting the bottom-of-the-stroke position of the slide 15, which means comprises a wedge 30 and a block 31 suspended from the crown; in this case the toggle lever 20 is connected to the block 31.

Numeral 35 designates a link connected to the joined toggle levers 20, 21, and, as here illustrated, the connection may be made advantageously to the pin 23 on which the toggle levers 20, 21 turn. The form of the levers 20, 21 in the illustrated embodiment is that frequently called "knuckle-joint" in press terminology. Other types of jointed slide connections are usable, such as the ordinary crank and connecting-rod as shown in my Patent #2,161,869.

Numeral 37 designates a driving rod which is connected to the link 35 in a suitable manner, as by means of a pin 39 which passes through the link 35 and also through the end of the driving rod 37. As here shown, the link 35 is duplicated, and is connected to the pin 35 at each side of the toggle levers 20, 21.

The driving rod 37 is reciprocated in any suitable manner. In the embodiment illustrated in Fig. 1 it is connected to a crank 41 on a shaft 43 which may be driven from a fly-wheel 45 through a suitable train of pinions and gears 46, 47, 48, 49.

Numeral 60 designates a guide for the link 35. This guide comprises an arcuate portion 62 which has a curvature on the radius of the link 35, and which is so constructed and arranged as to guide said link, when the toggle levers 20, 21 are in alinement, through a part of the movement of the driving rod 37, as will be hereinafter more fully explained. The guide 60 advantageously also comprises a portion 65 having any desired contour, as the straight contour shown. The portion 64 of the guide serves to guide the link 35 throughout the remainder of the movement imparted thereto by the driving rod 37. As here shown the guide 60 comprises spaced plates 66, 67 fastened to the frame. A brace 69 extending across the frame may be provided, for reenforcing the guide plate 67, so that the latter may better sustain the forces acting thereon during the driving of the slide. The guiding of the link 35 is advantageously effected through a roller 71 on the pin 39 which passes through the link, at the end which extends within the guide 60. The roller 71 may be duplicated at the opposite side of the press, as illustrated.

To exert the driving force most efficiently and with the driving parts at the best working angles at the time of greatest stress the direction of revolution of the crank 41 and its position is such that the thrust of the driving rod 37 is substantially at right angles to the link 35 in the part of the working stroke of the slide 15 at which it approaches its bottom-of-the-stroke position. This construction and arrangement is illustrated in Fig. 1, wherein the slide 15 is at its bottom-of-the-stroke position, the crank 41 turns counter-clockwise, and the driving-rod 37 is at right angles to the link 35, and substantially at right-angles approaching said position.

A press according to the present invention, with an eight inch stroke, and applying a working force of 200 tons, is operating at thirty strokes a minute, which is about three times the speed attainable with a purely hydraulic press, and at the same time the results obtained are better.

*Operation*

The slide 15 is illustrated in its bottom-of-the-stroke position in Fig. 1, and at the top of the stroke position Fig. 2.

Starting with the parts in the top-of-the-stroke position, (Fig. 2) on the down stroke of the driving rod 37, the link 35, guided at one end within the guide 60, moves down and swings toward the connected toggle links 20, 21, as the latter move toward an alined position. The die carried by the slide 15 meets the resistance of a die on the bed 11, through the intermediary of material to be formed between said dies, beyond the half stroke. When the rod 37 is crank driven, the movement of the slide 15 through a large part of its working stroke, and also through a large part of its return stroke, is fast, as illustrated by the portions $a$, $b$ of the curve on the graph Fig. 4. As the slide approaches its bottom-of-the-stroke position, and the dies meet the resistance of the material to be formed, the slide moves very slowly as compared with its down movement up to this time, and moves progressively slower until the movement stops. The movement of the slide 15 stops when the link 35 reaches a position perpendicular to the alined position of the toggle levers 20, 21, the position shown in Fig. 1 of the drawing. The relatively slow end movement of the slide 15 is shown by the part $c$ of the curve on the graph Fig. 4. When the toggle levers 20, 21 reach their position of alinement (position Fig. 1) the arcuate portion 62 of the guide 60 begins its action on the link 35. As the driving rod 37 continues its movement, the guided end of the link 35 moves within said arcuate portion 62 of the guide, and while said guided end of the link 35 moves in the arcuate portion 62, the toggle levers 20, 21 remain in their position of alinement, no movement being imparted thereto by the driving rod 37, and the slide 15 has an absolute dwell. With the construction and arrangement illustrated the slide dwells absolutely through 130° of the crank movement, the working and return strokes of the slide being effected in the remaining 230°. Normally the cycles are continuous or successive one on another, a long absolute dwell being attained with a press according to the present invention without the use of a clutch.

The length of the absolute dwell may be varied by varying the length of travel (oscillation) of the link 35 in the arcuate portion 62 of the guide.

To reliably prevent a back throw of the alined toggle levers 20, 21, under pressure, the effective angular width of the arcuate portion 62, and of the arc of oscillation of the link 35, should not exceed 45°.

During the idle parts of the working and return strokes the movement of the slide is relatively very fast, as indicated by the parts $a$ and $b$ in the curve on the graph, Fig. 4. When pressure is being applied by the dies the slide 15 moves relatively slowly, the speed of movement diminishing progressively until the slide reaches its position of absolute dwell at the bottom of its stroke. This part of the movement is indicated by the part $c$ in the curve. During the movement of the slide in the part $c$ of the curve pressure is applied by the dies to the material being formed gradually, the internal inertia or resistance to flow within the material is overcome gradually, and therefore the flow of the material is more readily produced, and the flowing material has a time interval in which to fill out the recesses in the space formed between the dies, and to expel the air ahead of it, thus producing full and accurate shapes. During the time of absolute dwell of the slide 15, represented by the portion $d$ of the curve, the internal stresses in the material have time to play out, and to become much weakened or exhausted, and the formed article, after the pressure of the dies is removed, is enabled to retain its precise shape, and not to be warped or deflected from such precise shape by stresses which would otherwise be left in the material.

The novel movement of the slide and its application of force to the material being formed produces an easy movement of the parts and reduces the shocks and strains in their action. Dies also have a much longer efficient life than in the ordinary type of mechanical press.

By the novel movement a long absolute dwell of the slide at the bottom of its working stroke is obtained without the use of a clutch, the cycles of operation being normally successive and continuous. The use of a clutch in the stressed condition of the press is extremely hard on clutches, and in presses having heavy tonnage ratings, it is impractical to use clutches, especially positive clutches, with the press in its stressed condition.

What is claimed is:

1. A mechanical type press having a long and absolute dwell at the bottom-of-the-stroke position of its reciprocatory tool-carrying slide, in a continuing cycle, comprising a frame, a reciprocatory tool-carrying slide, toggle-levers connecting said slide to said frame, a driving rod and means for reciprocating it, a link connecting said driving-rod and said toggle-levers, and a guide for said link, said guide having an arcuate portion on a radius corresponding to the length of said link, constructed and arranged to guide said link while said toggle levers are in alinement and said driving rod continues its movement through a part of its cycle of movement.

2. A mechanical type press according to claim 1, wherein the angular width of the movement of said link does not exced 45° during the part of its movement under the control of said arcuate portion of said guide.

3. A mechanical type press according to claim 1, wherein the construction and arrangement of said driving rod, link and toggle-levers is such that the thrust of said driving rod is substantially at right angles to said link in the part of the working stroke of said slide at which said slide approaches its bottom-of-the-stroke position.

4. A mechanical type press according to claim 1, further including a crank for driving said driving-rod.

5. A mechanical type press according to claim 1, wherein said slide has an absolute dwell of approximately 130° in its bottom-of-the-stroke position, completes its working and return strokes rapidly, and slowly approaches the end of its working stroke, in the remaining 230° of its cycle of movement.

WILLIAM KLOCKE.